United States Patent Office 3,518,263
Patented June 30, 1970

3,518,263
BASICALLY SUBSTITUTED 10,5-(EPOXYMETH-
ANO) - 10,11 - DIHYDRO - 5H - DIBENZO[a,d]
CYCLOHEPTEN-13-ONES
Thomas A. Dobson and Martin A. Davis, Montreal, Quebec, Canada, assignors to American Home Products Corporation, New York, N.Y., a corporation of Delaware
No Drawing. Filed Nov. 1, 1966, Ser. No. 591,106
Int. Cl. C07d 87/36
U.S. Cl. 260—247.2                     6 Claims

ABSTRACT OF THE DISCLOSURE

The title compounds are prepared by reacting the corresponding 11-bromo compounds with a secondary amine. Geometrical isomers are obtained by reacting 10,11 - epoxy - 10,11 - dihydro - 5H - dibenzo[a,d]cycloheptene-5-carboxylic acid with a secondary amine. The compounds are antibacterials and trichomonicidal agents.

This invention relates to novel chemical compounds which have useful biological properties. In particular this invention relates to derivatives of 10,5-epoxymethano)-10,11-dihydro - 5H - dibenzo[a,d]cyclohepten-13-one of the following generic Formula I:

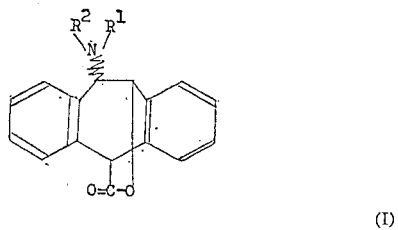

(I)

wherein $R^1$ and $R^2$ are the same or different and represent a lower alkyl group containing from 1–6 carbon atoms, or an aralkyl group containing from 7–10 carbon atoms such as, for example, the benzyl, phenethyl, or trimethoxybenzyl groups. In addition the grouping $NR^1R^2$ may itself form part of a heterocycle containing from 1–2 hetero atoms, such as, for example, the pyrrolidino, piperidino, 4-(lower alkyl) or 4-phenyl-substituted piperazino, and morpholino rings. This invention also relates to the salts of the compounds of Formula I with pharmaceutically acceptable acids such as, for example, hydrochloric, sulphuric, oxalic, maleic, or tartaric acid. The compounds of Formula I are readily obtained from the reaction of 11-bromo-10,5-(epoxymethano)-10,11-dihydro-5H-dibenzo[a,d]cyclohepten-13-one of Formula II with secondary amines of formula $HNR^1R^2$ wherein $R^1$ and $R^2$ are as defined above or the grouping $NR^1R^2$ is as defined above.

More specifically, a mixture of 11-bromo-10,5-(epoxymethano)-10,11-dihydro - 5H - dibenzo[a,d]cyclohepten-13-one and a molar excess of a secondary amine of formula $HNR^1R^2$ wherein $R^1$ and $R^2$ or the grouping $NR^1R^2$ is as defined above and, optionally, an inert solvent such as, for example, benzene, is stirred at a temperature within the range of from 0–50° C. for a period of time of up to one day. The mixture is concentrated to dryness and the residue is extracted with hot water; the water-insoluble residue is purified in a conventional manner such as, for example, by chromatography or crystallization, to give the compound of Formula I wherein either $R^1$ and $R^2$ or the grouping $NR^1R^2$ are as defined above.

Geometrical isomers of the compounds of Formula I are readily prepared by the interaction of 10,11-epoxy-10,11 - dihydro - 5H - dibenzo[a,d]cycloheptene - 5-carboxylic acid of Formula III with a secondary amine of Formula $HNR^1R^2$ wherein either $R^1$ and $R^2$ or the grouping $NR^1R^2$ are as defined above.

More specifically, a mixture of 10,11-epoxy-10,11-dihydro-5H-dibenzo[a,d]cycloheptene - 5 - carboxylic acid, and a molar excess of a secondary amine of formula $HNR^1R^2$ wherein either $R^1$ and $R^2$ or the grouping $NR^1R^2$ are as defined above, and an inert solvent such as, for example, toluene or xylene, is heated at a temperature within the range of from 100–150° C. for a period of time of up to one day, either at atmospheric pressure or in a sealed vessel, to yield, after removal of the solvent and purification of the residue in a conventional manner such as, for example, by chromatography or crystallization, the compounds of Formula I wherein either $R^1$ and $R^2$ or the grouping $NR^1R^2$ is as defined above.

One of the starting materials for the compounds of this invention, that is 11-bromo-10,5-(epoxymethano)-10,11-dihydro-5H-dibenzo[a,d]cyclohepten-13-one is prepared as decribed in our co-pending U.S. patent application S.N. 539,640 filed Apr. 4, 1966, now Pat. No. 3,361,767. In brief, one molar proportion of bromine is added to 5H-dibenzo[a,d]cycloheptene-5-carboxamide, prepared as described by M. A. Davis et al. in J. Med. Chem. 7, 88 (1964), and the resulting dibromo-compound is treated with boiling water to give 11-bromo-10,5 - (epoxymethano) - 10,11 - dihydro - 5H - dibenzo-[a,d]cyclohepten-13-one.

The other starting material for the compounds of this invention, that is 10,11-epoxy-10,11-dihydro-5H-dibenzo-[a,d] cycloheptene-5-carboxylic acid of Formula III is prepared by the interaction of 11-bromo-10,5-(epoxymethano)-10,11-dihydro - 5H - dibenzo[a,d]cyclohepten-13-one with an aqueous solution of an alkali metal hydroxide.

More specifically, 11-bromo - 10,5 - (epoxymethano)-10,11-dihydro-5H-dibenzo[a,d]cyclohepten-13-one is rapidly added to a vigorously stirred molar excess of an alkali metal hydroxide, optionally sodium hydroxide, dissolved in 5–10 times its weight of water, at a temperature within the range of 80°–100° C. The mixture is stirred for a period of up to two hours and then acidified.

The precipitate is collected and purified by crystallization to give the required 10,11-epoxy-10,11-dihydro-5H-dibenzo[a,d]cycloheptene-5-carboxylic acid.

The compounds of this invention have valuable biological properties. They are active against a number of gram-positive and gram-negative microorganisms and are antibacterial agents. For such use they are formulated in the form of creams, lotions, or ointments containing from 0.1–1.0 of the active ingredient. Such lotions, creams and ointments are applied topically to the skin from twice to four times daily, over a period of from 5–15 days. Additionally the compounds of Formula I also possess activity against *Trichomonas vaginalis* and are trichomonicidal agents. For such use they may be formulated in the form of suppositories or vaginal inserts containing from 40–200 mg. of the active ingredient. Such suppositories or vaginal inserts are to be administered twice to four times daily, over a period of from 5 to 15 days.

The following formula and descriptive examples will illustrate this invention but are not however, to be construed to limit it thereto.

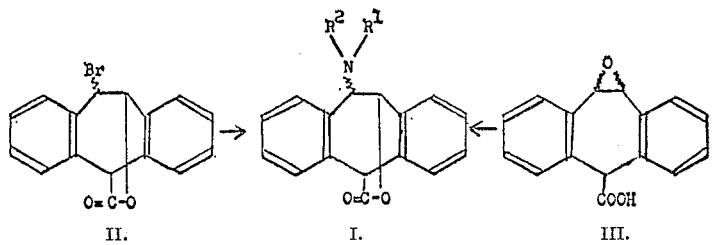

EXAMPLE 1

11-dimethylamino-10,5-(epoxymethano)-10,11-dihydro-5H-dibenzo[a,d]cyclohepten-13-one Finely powdered 11-bromo-10,5-(epoxymethano)-10,11-dihydro-5H-dibenzo[a,d]cyclohepten-13-one (15.0 g.) is added in small portions to anhydrous dimethylamine (50 ml.). The mixture is stirred for 4 hours under reflux conditions. The excess of the amine is then evaporated and the residual matter is triturated with water. The water-insoluble material thus obtained is recrystallized from methanol to give the title product, with M.P. 152–154° C. Elemental analysis confirms the empirical formula $C_{18}H_{17}NO_2$.

Treatment of the title compound with a molar excess of oxalic acid in ether gives the oxalate salt of 11-dimethylamino-10,5-(epoxymethano) - 10,11 - dihydro-5H-dibenzo[a,d]cyclohepten-13-one. This material has M.P. 140–145° C. after recrystallization from methanol.

In a similar manner, but using diethylamine, dipropylamine, dibutylamine, dipentylamine, dihexylamine, N-methylpropylamine, N-butylpentylamine, N-ethylhexylamine, N-methylbenzylamine, N-propylphenethylamine in place of dimethylamine the corresponding 11-diethylamino-, 11-dipropylamino-, 11-dibutylamino-, 11-dipentylamino-, 11-dihexylamino-, 11-(N-methylpropylamino)-, 11-(N-butylpentylamino)-, 11-(N-ethylhexylamino)-, 11-(N-methylbenzylamino)-, or 11-(N-propylphenethylamino) - 10,5 - (epoxymethano)-10,11-dihydro-5H-dibenzo[a,d]cyclohepten-13-one is obtained. Treatment of the latter compounds with hydrochloric, sulfuric, oxalic, maleic, or tartaric acids yields the corresponding hydrochloride, sulfate, oxalate, maleate, or tartrate salts.

EXAMPLE 2

11-piperidino-10,5-(epoxymethano)-10,11-dihydro-5H-dibenzo[a,d]cyclohepten-13-one Finely powdered 11-bromo-10,5-(epoxymethano)-10,11-dihydro-5H-dibenzo[a,d]cyclohepten-13-one (15.0 g.) is added with stirring to piperidine (25 ml.). The mixture is stirred at room temperature over-night and processed as described in Example 1, to give the title product, M.P. 203–205° C. when recrystallized from isopropanol. Elemental analysis confirms the empirical formula $C_{21}H_{21}NO_2$

EXAMPLE 3

11-morpholino-10,5-(epoxymethano)-10,11-dihydro-5H-dibenzo[a,d]cyclohepten-13-one In the same manner as described in Example 2, but using morpholine in place of piperidine, the above title compound with M.P. 239–241° C., when recrystallized from dioxane or chloroform is obtained. Elemental analysis confirms the empirical formula $C_{20}H_{19}NO_3$.

A geometrical isomer of the above title product is prepared in the following manner. Thus, a mixture of 10,11-epoxy-10,11-dihydro - 5H - dibenzo[a,d]cycloheptene-5-carboxylic acid (2.5 g.) prepared as described in Example 5, morpholine (2.0 g.) and xylene (10 ml.) is heated under reflux for 12 hours. The mixture is cooled and extracted with dilute hydrochloric acid. The acid extracts are rendered alkaline with sodium bicarbonate and the precipitate is crystallized from methanol to give a geometrical isomer of the above title compound with M.P. 172–174° C. In a similar manner, but using dimethylamine, diethylamine, dipropylamine, dibutylamine, dipentylamine, dihexylamine, N-methylpropylamine, N-butylpentylamine, N - ethylhexylamine, N - methylbenzylamine, N-propylphenethylamine, piperidine, or N-methylpiperazine in place of morpholine, geometrical isomers of the compounds described in Examples 1, 2, and 4 are also obtained.

EXAMPLE 4

11-N-methylpiperazino-10,5-(epoxymethano)-10,11-dihydro-5H-dibenzo[a,d]cyclohepten-13-one In the same manner as described in Example 2, but using N-methylpiperazine in place of piperidine, the above title compound, with M.P. 180–182° C. when purified from isopropanol, is obtained. Elemental analysis confirms the empirical formula $C_{23}H_{22}N_2O_2$.

EXAMPLE 5

10,11-epoxy-10,11-dihydro-5H-dibenzo[a,d]cycloheptene-5-carboxylic acid

Finely powdered 11-bromo-10,5-(epoxymethano)-10,11-dihydro-5H-dibenzo[a,d]cyclohepten-13-one (19.7 g.) is added all at once to 10% aqueous sodium hydroxide solution (50 ml.) which is pre-heated to 90° C. The mixture is stirred and kept at 90° C. for 35 minutes. The mixture is rapidly cooled and then acidified with dilute hydrochloric acid. The precipitate is collected, washed with water, dried and crystallized from ethyl acetate to give the title compound with M.P. 161–163° C.

We claim:
1. 11-dimethylamino - 10,5-(epoxymethano)-10,11-dihydro-5H-dibenzo[a,d]cyclohepten-13-one, as claimed in claim 6.
2. 11 - piperidino-10,5-(epoxymethano)-10,11-dihydro-5H-dibenzo[a,d]cyclohepten - 13 - one, as claimed in claim 6.
3. 11-morpholino - 10,5 - (epoxymethano)-10,11-dihydro-5H-dibenzo[a,d]cyclohepten-13-one, as claimed in claim 6.
4. 11-N-methylpiperazino - 10,5 - (epoxymethano)-10,11 - dihydro - 5H - dibenzo[a,d]cyclohepten - 13-one, as claimed in claim 6.
5. The oxalate salt of 11-dimethylamino-10,5-(epoxymethano) - 10,11 - dihydro-5H-dibenzo[a,d]cyclohepten-13-one, as claimed in claim 6.

6. A compound selected from the group of compounds of the formula

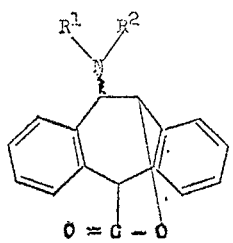

wherein $R^1$ and $R^2$ are lower alkyl, benzyl, phenethyl, tri- methoxybenzyl and together with the nitrogen atom form pyrrolidino, piperidino, N-methylpiperazino or morpholino; and salts thereof with pharmaceutically acceptable acids.

No references cited.

ALEX MAZEL, Primary Examiner

J. TOVAR, Assistant Examiner

U.S. Cl. X.R.

260—343.2, 268, 326.3, 294.3; 424—248, 250, 267, 274, 279